United States Patent
Bullington et al.

(10) Patent No.: US 7,413,847 B2
(45) Date of Patent: Aug. 19, 2008

(54) SEMICONDUCTOR-TYPE PROCESSING FOR SOLID-STATE LASERS

(75) Inventors: Jeff Bullington, Chuluota, FL (US); Richard Stoltz, Plano, TX (US)

(73) Assignee: Raydiance, Inc., Orlando, FL (US)

( * ) Notice: Subject to any disclaimer, the term of this patent is extended or adjusted under 35 U.S.C. 154(b) by 753 days.

(21) Appl. No.: 11/054,335

(22) Filed: Feb. 8, 2005

(65) Prior Publication Data
US 2005/0195726 A1    Sep. 8, 2005

Related U.S. Application Data

(60) Provisional application No. 60/543,086, filed on Feb. 9, 2004.

(51) Int. Cl.
*H01S 3/00* (2006.01)

(52) U.S. Cl. .......................... 430/321; 430/945; 372/70

(58) Field of Classification Search .................. None
See application file for complete search history.

(56) References Cited

U.S. PATENT DOCUMENTS

| | | | |
|---|---|---|---|
| 3,626,318 A * | 12/1971 | Young | 372/67 |
| 3,631,362 A | 12/1971 | Almasi et al. | |
| 3,808,549 A | 4/1974 | Maurer | |
| 3,851,267 A * | 11/1974 | Tanner | 359/343 |
| 3,963,953 A | 6/1976 | Thornton, Jr. | |
| 4,289,378 A | 9/1981 | Remy et al. | |
| 4,718,418 A | 1/1988 | L'Esperance, Jr. | |
| 4,722,591 A | 2/1988 | Haffner | |
| 4,750,809 A | 6/1988 | Kafka et al. | |
| 4,808,000 A | 2/1989 | Pasciak | |
| 4,815,079 A | 3/1989 | Snitzer et al. | |
| 4,824,598 A | 4/1989 | Stokowski | |
| 4,829,529 A | 5/1989 | Kafka | |
| 4,849,036 A * | 7/1989 | Powell et al. | 156/99 |
| 4,902,127 A | 2/1990 | Byer et al. | |
| 4,913,520 A | 4/1990 | Kafka | |
| 4,915,757 A | 4/1990 | Rando | |
| 4,972,423 A | 11/1990 | Alfano et al. | |

(Continued)

FOREIGN PATENT DOCUMENTS

EP        214100 A        3/1987

(Continued)

OTHER PUBLICATIONS

Limpert et al., "All Fiber Chirped-Pulse Amplification System Based on Compression in Air-Guiding Photonic Bandgap Fiber", Optics Express, Dec. 1, 2003, vol. 11, No. 24, pp. 3332-3337.

(Continued)

*Primary Examiner*—John A. McPherson
(74) *Attorney, Agent, or Firm*—Carr & Ferrell LLP

(57) ABSTRACT

The present invention includes a method of fabricating an optically-pumped disk-array solid-state laser amplifier having one or more disks, wherein one or more of the one or more disks having two opposed surfaces, including the steps of patterning a photoresist mask on one or more of the two opposed surfaces of the one or more disks and processing the one or more disks through the patterned photoresist mask, whereby the temperature profile improved radially across the disk's surface, amplified spontaneous emission are reduced, or combinations thereof.

15 Claims, 1 Drawing Sheet

U.S. PATENT DOCUMENTS

| | | |
|---|---|---|
| 5,014,290 A | 5/1991 | Moore et al. |
| 5,122,439 A | 6/1992 | Miersch et al. |
| 5,132,996 A | 7/1992 | Moore et al. |
| 5,162,643 A | 11/1992 | Currie |
| 5,166,818 A | 11/1992 | Chase et al. |
| 5,187,759 A | 2/1993 | DiGiovanni et al. |
| 5,237,576 A | 8/1993 | DiGiovanni et al. |
| 5,265,107 A | 11/1993 | Delfyett, Jr. |
| 5,291,501 A | 3/1994 | Hanna |
| 5,302,835 A | 4/1994 | Bendett et al. |
| 5,313,262 A | 5/1994 | Leonard |
| 5,329,398 A | 7/1994 | Lai et al. |
| 5,367,143 A | 11/1994 | White, Jr. |
| 5,400,350 A | 3/1995 | Galvanauskas |
| 5,414,725 A | 5/1995 | Fermann et al. |
| 5,418,809 A | 5/1995 | August, Jr. et al. |
| 5,430,572 A | 7/1995 | DiGiovanni et al. |
| 5,440,573 A | 8/1995 | Fermann |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,517,043 A | 5/1996 | Ma et al. |
| 5,548,098 A | 8/1996 | Sugawara et al. |
| 5,572,335 A | 11/1996 | Stevens |
| 5,572,358 A | 11/1996 | Gabl et al. |
| 5,585,652 A | 12/1996 | Kamasz et al. |
| 5,585,913 A | 12/1996 | Hariharan et al. |
| 5,592,327 A | 1/1997 | Gabl et al. |
| 5,596,668 A | 1/1997 | DiGiovanni et al. |
| 5,602,677 A | 2/1997 | Tournois |
| 5,617,434 A | 4/1997 | Tamura et al. |
| 5,627,848 A | 5/1997 | Fermann et al. |
| 5,633,750 A | 5/1997 | Nogiwa et al. |
| 5,633,885 A | 5/1997 | Galvanauskas et al. |
| 5,656,186 A | 8/1997 | Mourou et al. |
| 5,663,731 A | 9/1997 | Theodoras, II et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Thoedoras, II et al. |
| 5,720,894 A | 2/1998 | Neev et al. |
| 5,726,855 A | 3/1998 | Mourou et al. |
| 5,778,016 A | 7/1998 | Sucha et al. |
| 5,818,630 A | 10/1998 | Fermann et al. |
| 5,822,097 A | 10/1998 | Tournois |
| 5,847,863 A | 12/1998 | Galvanauskas et al. |
| 5,862,287 A | 1/1999 | Stock et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,936,716 A | 8/1999 | Pinsukanjana et al. |
| 6,014,249 A | 1/2000 | Fermann et al. |
| 6,020,591 A | 2/2000 | Harter et al. |
| 6,034,975 A | 3/2000 | Harter et al. |
| 6,061,373 A | 5/2000 | Brockman et al. |
| 6,072,811 A | 6/2000 | Fermann et al. |
| 6,075,588 A | 6/2000 | Pinsukanjana et al. |
| 6,081,369 A | 6/2000 | Waarts et al. |
| 6,120,857 A | 9/2000 | Balooch et al. |
| 6,130,780 A | 10/2000 | Joannopoulos et al. |
| 6,151,338 A | 11/2000 | Grubb et al. |
| 6,154,310 A | 11/2000 | Galvanauskas et al. |
| 6,156,030 A | 12/2000 | Neev |
| 6,181,463 B1 | 1/2001 | Galvanauskas et al. |
| 6,198,568 B1 | 3/2001 | Galvanauskas et al. |
| 6,208,458 B1 | 3/2001 | Galvanauskas et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,269,108 B1 | 7/2001 | Tabirian et al. |
| 6,275,512 B1 | 8/2001 | Fermann |
| 6,303,903 B1 | 10/2001 | Liu |
| 6,314,115 B1 | 11/2001 | Delfyett et al. |
| 6,327,074 B1 | 12/2001 | Bass et al. |
| 6,327,282 B2 | 12/2001 | Hammons et al. |
| 6,334,011 B1 | 12/2001 | Galvanauskas et al. |
| 6,335,821 B1 | 1/2002 | Suzuki et al. |
| RE37,585 E | 3/2002 | Mourou et al. |
| 6,355,908 B1 | 3/2002 | Tatah et al. |
| 6,362,454 B1 | 3/2002 | Liu |
| 6,365,869 B1 | 4/2002 | Swain et al. |
| 6,370,171 B1 | 4/2002 | Horn et al. |
| 6,404,944 B1 | 6/2002 | Wa et al. |
| 6,421,169 B1 | 7/2002 | Bonnedal et al. |
| 6,433,303 B1 | 8/2002 | Liu et al. |
| 6,433,305 B1 | 8/2002 | Liu et al. |
| 6,433,760 B1 | 8/2002 | Vaissie et al. |
| 6,501,590 B2 | 12/2002 | Bass et al. |
| 6,522,460 B2 | 2/2003 | Bonnedal et al. |
| 6,525,873 B2 | 2/2003 | Gerrish et al. |
| 6,526,327 B2 | 2/2003 | Kar et al. |
| 6,529,319 B2 | 3/2003 | Youn et al. |
| 6,549,547 B2 | 4/2003 | Galvanauskas et al. |
| 6,567,431 B2 | 5/2003 | Tabirian et al. |
| 6,573,813 B1 | 6/2003 | Joannopoulos et al. |
| 6,574,024 B1 | 6/2003 | Liu |
| 6,576,917 B1 | 6/2003 | Silfvast |
| 6,580,553 B2 | 6/2003 | Kim et al. |
| 6,587,488 B1 * | 7/2003 | Meissner et al. ......... 372/29.01 |
| 6,597,497 B2 | 7/2003 | Wang et al. |
| 6,603,911 B2 | 8/2003 | Fink et al. |
| 6,621,045 B1 | 9/2003 | Liu et al. |
| 6,627,844 B2 | 9/2003 | Liu et al. |
| 6,642,477 B1 | 11/2003 | Patel et al. |
| 6,647,031 B2 | 11/2003 | Delfyett et al. |
| 6,654,161 B2 | 11/2003 | Bass et al. |
| 6,661,816 B2 | 12/2003 | Delfyett et al. |
| 6,671,298 B1 | 12/2003 | Delfyett et al. |
| 6,690,686 B2 | 2/2004 | Delfyett et al. |
| 6,710,288 B2 | 3/2004 | Liu et al. |
| 6,710,293 B2 | 3/2004 | Liu et al. |
| 6,720,519 B2 | 4/2004 | Liu et al. |
| 6,723,991 B1 | 4/2004 | Sucha et al. |
| 6,728,439 B2 | 4/2004 | Weisberg et al. |
| 6,735,229 B1 | 5/2004 | Delfyett et al. |
| 6,738,144 B1 | 5/2004 | Dogariu |
| 6,744,555 B2 | 6/2004 | Galvanauskas et al. |
| 6,749,285 B2 | 6/2004 | Liu et al. |
| 6,760,356 B2 | 7/2004 | Erbert et al. |
| 6,774,869 B2 | 8/2004 | Biocca et al. |
| 6,782,207 B1 | 8/2004 | Efimov |
| 6,787,734 B2 | 9/2004 | Liu |
| 6,788,864 B2 | 9/2004 | Ahmad et al. |
| 6,791,060 B2 | 9/2004 | Dunsky et al. |
| 6,801,551 B1 | 10/2004 | Delfyett et al. |
| 6,803,539 B2 | 10/2004 | Liu et al. |
| 6,804,574 B2 | 10/2004 | Liu et al. |
| 6,807,375 B2 | 10/2004 | Dogariu |
| 6,815,638 B2 | 11/2004 | Liu |
| 6,819,694 B2 | 11/2004 | Jiang et al. |
| 6,819,837 B2 | 11/2004 | Li et al. |
| 6,822,251 B1 | 11/2004 | Arenberg et al. |
| 6,829,517 B2 | 12/2004 | Cheng et al. |
| 6,878,900 B2 | 4/2005 | Corkum et al. |
| 6,897,405 B2 | 5/2005 | Cheng et al. |

| | | |
|---|---|---|
| 2002/0176676 A1 | 11/2002 | Johnson et al. |
| 2003/0053508 A1* | 3/2003 | Dane et al. .................... 372/70 |
| 2004/0231682 A1 | 11/2004 | Stoltz |
| 2005/0035097 A1 | 2/2005 | Stoltz |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0074974 A1 | 4/2005 | Stoltz |
| 2005/0077275 A1 | 4/2005 | Stoltz |
| 2005/0127049 A1 | 6/2005 | Woeste et al. |
| 2005/0167405 A1 | 8/2005 | Stoltz et al. |
| 2005/0171516 A1 | 8/2005 | Stoltz |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2006/0120418 A1 | 6/2006 | Harter et al. |

FOREIGN PATENT DOCUMENTS

| | | |
|---|---|---|
| JP | 2003181661 A | 7/2003 |
| WO | WO 9428972 A1 | 12/1994 |
| WO | WO 2004/105100 A2 | 12/2004 |
| WO | WO 2004/114473 A2 | 12/2004 |
| WO | WO 2005/018060 A2 | 2/2005 |
| WO | WO 2005/018061 A2 | 2/2005 |
| WO | WO 2005/018062 A2 | 2/2005 |
| WO | WO 2005/018063 A2 | 2/2005 |

OTHER PUBLICATIONS

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

U.S. Appl. No. 10/916,368, filed Aug. 11, 2004, Richard Stoltz, Pulsed Energy Adjustment for Changes in Ablation Spot Size.

U.S. Appl. No. 11/057,867, filed Feb. 13, 2005, Michael Marshall Mielke, Method of Generating an Ultra-Short Pulse Using a High-Frequency Ring Oscillator.

U.S. Appl. No. 11/057,868, filed Feb. 13, 2005, Michael Marshall Mielke, Amplifying of high Energy Laser Pulses.

U.S. Appl. No. 11/233,634, filed Sep. 22, 2005, James F. Brennan III, Wavelength-Stabilized Pump Diodes for Pumping Gain Media in an Ultrashort Pulsed Laser System.

U.S. Appl. No. 11/112,256, filed Apr. 22, 2005, James F. Brennan III, Bragg Fibers in Systems for the Generation of High Peak Power Light.

U.S. Appl. No. 11/229,302, filed Sep. 15, 2005, Michael Marshall Mielke, Actively Stabilized Systems for the Generation for Ultrashort Optical Pulses.

U.S. Appl. No. 11/224,867, filed Sep. 12, 2005, Peter Delfyett, Laser Ablation Method and Apparatus Having a Feedback Loop and Control Unit.

U.S. Appl. No. 10/916,365, filed Aug. 11, 2005, Richard Stoltz, Ablative Material Removal with a Preset Removal Rate or Volume or Depth.

Yeh et al., "Theory of Bragg Fiber", Journal of the Optical Society America, Sep. 1978, p. 1196, vol. 68, No. 9.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Siegman, "Unstable Optical Resonators", Applied Optics, Feb. 1974, pp. 353-367, vol. 13, No. 2.

Koechner, "Solid State Laser Engineering", Oct. 29, 1999, Section 5.5, pp. 270-277, 5th Edition, Springer.

Chen et al, "Dispersion-Managed Mode Locking", Journal of the Optical Society of America B, Nov. 1999, pp. 1999-2004, vol. 16, No. 11, Optical Society of America.

Resan et al, "Dispersion-Managed Semiconductor Mode-Locked Ring Laser", Optics Letters, Aug. 1, 2003, pp. 1371-1373, vol. 28, No. 15, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Delfyett, P et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Levy et al., "Engineering Space-Variant INhomegeneous Media for Polarization Control," Optics Letters, Aug. 1, 2004, pp. 1718-1720, vol. 29, No. 15, Optical Society of America.

Ibanescu et al., "Analysis of Mode Structure in Hollow Dielectric Waveguide Fibers," Physical Review E 67, 2003, The American Physical Society.

* cited by examiner

SEMICONDUCTOR-TYPE PROCESSING FOR SOLID-STATE LASERS

CROSS-REFERENCE TO RELATED APPLICATIONS

This application claims priority to United States Provisional Patent Applications: entitled, "Semiconductor-Type Processing for Solid-State Lasers", Ser. No. 60/543,086 filed Feb. 9, 2004, the entire content thereof incorporated by reference.

TECHNICAL FIELD OF THE INVENTION

The present invention relates generally to the field of light amplification, and in particular, to a semiconductor-type processing.

BACKGROUND OF THE INVENTION

Without limiting the scope of the invention, its background is described in connection with semiconductor-type processing, as an example.

Ablative material removal is especially useful for medical purposes, either in-vivo or on the outside surface (e.g., skin or tooth), as it is essentially non-thermal and generally painless. Ablative removal of material is generally done with a short optical pulse that is stretched amplified and then compressed. A number of types of laser amplifiers have been used for the amplification.

Laser machining can remove ablatively material by disassociating the surface atoms and melting the material. Laser ablation is efficiently done with a beam of short pulses (generally a pulse-duration of three picoseconds or less). Techniques for generating these ultra-short pulses (USP) are described, e.g., in a book entitled "Femtosecond Laser Pulses" (C. Rulliere, editor), published 1998, Springer-Verlag Berlin Heidelberg New York. Generally large systems, such as Ti:Sapphire, are used for generating ultra-short pulses.

The USP phenomenon was first observed in the 1970's, when it was discovered that mode-locking a broad-spectrum laser could produce ultra-short pulses. The minimum attainable pulse duration is limited by the bandwidth of the gain medium, which is inversely proportional to this minimal or Fourier-transform-limited pulse duration. Mode-locked pulses are typically very short and will spread (i.e., undergo temporal dispersion) as they traverse any medium. Subsequent pulse-compression techniques are often used to obtain USPs. Pulse dispersion can occur within the laser cavity so that compression techniques are sometimes added intra-cavity. A diffraction grating compressor is shown, e.g., in U.S. Pat. No. 5,822,097 by Tournois. Pulse dispersion can occur within the laser cavity so that compression (dispersion-compensating) techniques are sometimes added intra-cavity. When high-power pulses are desired, they are intentionally lengthened before amplification to avoid internal component optical damage. This is referred to as "Chirped Pulse Amplification" (CPA). The pulse is subsequently compressed to obtain a high peak power (pulse-energy amplification and pulse-duration compression).

As a result, there is a need for a method of improving solid-state laser amplifiers through the modification of the surfaces of the disks and modifications into the surfaces of the disks to a significant depth.

SUMMARY OF THE INVENTION

The present invention provides a method of improving the temperature profile across the disks and better matching of the pumping input with the beam profile to substantial reduce amplified spontaneous emission in solid-state laser amplifiers through the modification of the surfaces of the disks and modifications into the surfaces of the disks to a significant depth.

A beam of high energy, ultra-short (generally sub-picosecond) laser pulses can ablate (literally vaporize) any material (including steel or even diamond). Such a pulse has an energy-per-unit-area that ionizes the atoms of spot on a surface and the ionized atoms are repelled from the surface. A series of pulses can rapidly create a deep hole. Laser ablation is a preferred use for the amplifiers described herein. Some machining applications can be done with small (e.g., 10 to 20 micron diameter) spots, but other applications need larger (e.g., 40 to 100 micron) spots.

While solid-state laser systems can supply enough energy in a form compressible to short-enough pulses for the larger spot sizes; the efficiency of such systems has been very low (e.g., generally less than 1%), creating major heat dissipation problems, and thus requiring very expensive systems that provide only slow machining due to low pulse repetition rates. The present invention includes a controlled beam pattern within the amplifier and can essentially eliminate heating due to amplified spontaneous emission. The present invention can operate at wavelengths such that the optical amplifier can be directly pumped by laser diodes emitting wavelengths of greater than about 900 nm, further increasing the efficiency. Generally, the optical amplifier is an optically-pumped solid-state disc array laser, and preferably a $Cr^{4+}$:YAG laser.

The present invention includes a method of processing one or more disks of a disk-array arrangement using semiconductor-type processing. The beam passes axially through the disk array generally through the thin dimension of the disks. The semiconductor-type processing allows modification of the surfaces or modification into the surface of the disk to a significant depth (e.g., patterning). The patterning may be used to produce gratings on either or both surfaces of the disks. The patterning may cover the entire surface, a portion of the surface, different portion of the surface on different disks or combinations thereof. The patterning can allow diffusion or implanting of one or more dopants and the variation of the doping level may be controlled. For example, a Gaussian doping level of $Cr^{4+}$ radially into a YAG disk to match a Gaussian distribution of light in the beam. In one embodiment, the doping may be heavier near the surface, providing a shorter path for heat dissipation and better cooling.

In one embodiment of the present invention, the optically pumped optical amplifier is pumped by laser diodes with an emission wavelength of greater than about 900 nm. In another embodiment, the amplified beam has a wavelength of about 1550 nm. The optically pumped optical amplifier may be of another type, for example, a Ti:sapphire solid-state laser, but is preferably a $Cr^{4+}$:YAG laser. In some embodiments, the amplifier may be used in laser ablation.

One embodiment of the present invention includes a method of fabricating an optically-pumped disk-array solid-state laser amplifier having one or more disks, wherein one or more of the one or more disks having two opposed surfaces, including the steps of patterning a photoresist mask on one or more of the two opposed surfaces of the one or more disks and processing the one or more disks through the patterned photoresist mask, whereby the temperature profile improved radially across the disk's surface, amplified spontaneous emission are reduced, or combinations thereof.

In some embodiments, the semiconductor-type processing includes adding one or more dopants to the one or more disks. The dopant may include one or more different dopants. Additionally, the one or more disks may be doped with similar or different dopants or combination of dopants. In some embodiments, the dopant may at least partially diffuse through the photoresist mask. The dopant may be implanted through the photoresist mask. In some embodiments, the processing varies the doping of the disks (e.g., dopant is diffused through the mask or implanted through the mask). Additionally, the dopant may have a Gaussian profile to match a Gaussian beam profile.

The patterning and depositions may use proven semiconductor fabrication techniques. The patterning can be formed by photoresist lithography using openings. In some embodiments the openings may be in the form of lines or dots, although other embodiments may use other shapes. The sizes of openings and the spacing of the openings may be varied to change the amount of doping that enters the disk at different locations. The remaining mask dimensions may be small compared to the light wavelength. Furthermore, the sub-micron local variations may have a negligible effect on the diffusion or implantation. In one embodiment, a reusable masks may be used to create patterns with appropriately placed holes can be used in place of the photoresist. The mask may be of a variety of compositions known in the art and may include metal.

In some embodiments, one or more channels may be etched at least partially through the photoresist mask, e.g., to reduce reflection at the surface and/or aid in the cooling the surface. The one or more channels may be used as part of a heat pipe disk cooler and may take a variety of forms depending on the particular needs of the application. The one or more channels may be partially filled with one or more liquids. In some embodiments, the one or more channels may be filled with one or more liquids. Furthermore, the one or more channels may be filled by capillary action. The liquid may be a liquid, a mixture of liquids, a heterogeneous mixture or a homogeneous mixture.

The present invention also includes a method of fabricating a disk-array laser amplifier, including the steps of patterning a mask on at least one side of at least one of the disks in the disk-array and processing the one or more disks through the patterned mask to improve performance of the amplifier.

In addition, the present invention includes a beam produced by a disk-array laser amplifier processed by the present invention, wherein the beam is produced including the steps of is amplifying the beam in a first pass, expanding the beam using a convex mirror, amplifying the beam in a second pass, re-collimating the beam using a concave mirror, wherein the axial input of the beam is done through a hole in the concave mirror, with the convex mirror essentially the same size as the hole in the concave mirror. However, other types of mirrors may be used (e.g., flat mirror) in addition to a lens and flat mirror.

The present invention includes a method of fabricating a disk-array solid-state laser amplifier, including the steps of patterning a mask on one or more sides of one or more surfaces of the disks in the disk-array and processing the one or more disks through the patterned mask to improve performance of the amplifier.

BRIEF DESCRIPTION OF THE DRAWINGS

For a more complete understanding of the features and advantages of the present invention, reference is now made to the detailed description of the invention along with the accompanying figure and in which.

DETAILED DESCRIPTION OF THE INVENTION

Figure 1:
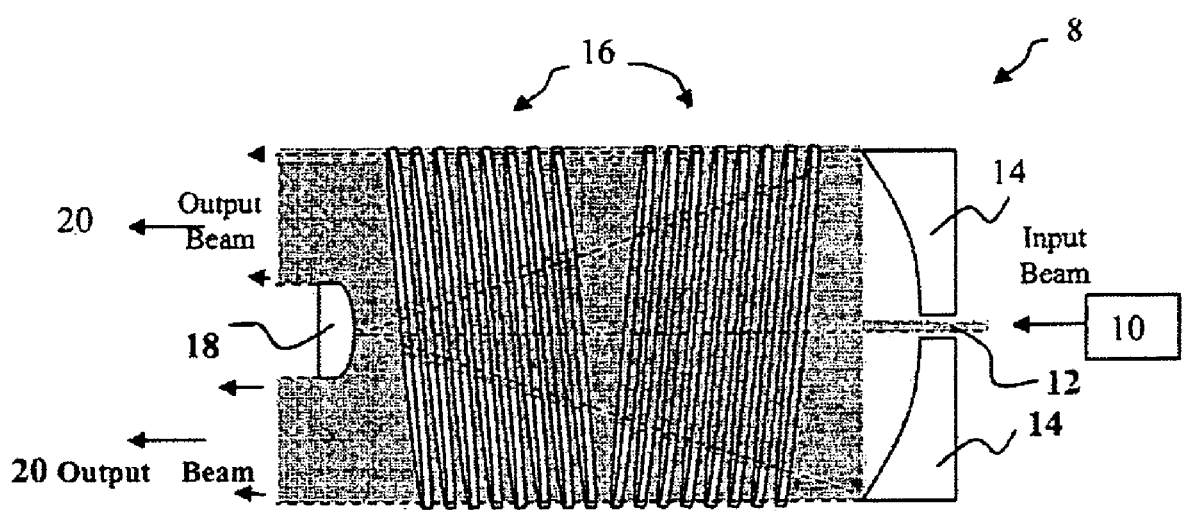
FIG. 1 illustrates a sectional view of a three-pass disk-array optical amplifier in accordance with the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a," "an" and "the" are not intended to refer to only a singular entity, but include the general class of which a specific example may be used for illustration. The terminology herein is used to describe specific embodiments of the invention, but their usage does not delimit the invention, except as outlined in the claims.

Solid-state laser amplifier may be used as the high-power laser amplifiers for laser ablation. It generally uses multiple thin disks (e.g., a Cr:YAG) that are patterned using semiconductor-type processing (e.g., doped through a photoresist mask by diffusion or ion-implanting). The processing of the present invention results in more even temperature profile across the disks (and better cooling) and better matching of the pumping input with the beam profile to substantial reduce amplified spontaneous emission (ASE). Thus, resulting in an increased efficiency and also reduce heating of the disks.

The present invention may also control the beam pattern within the amplifier and can essentially eliminate heating due to amplified spontaneous emission. Further, the disk surface can be patterned and etched to create channels for A/R gratings or cooling in the disk surface.

Because of the disk-array arrangement (as opposed to the normal solid-state rod arrangement), it is practical to process the disks by semiconductor-type processing. The beam passes axially through the disk-array, generally through the thin dimension of the disks. The processing can allow modification of the surfaces and/or of a significant depth into the disk. The patterning may produce gratings on either or both surfaces of the disks. The patterning may also allow diffusion or implanting a controlled variation of doping level. For example, the Gaussian doping level of $Cr^{4+}$ radially into a YAG disk may be matched to the Gaussian distribution of light in the beam.

The present invention includes a multiple-disc laser configuration that can be manufactured using semiconductor processing techniques known to persons of ordinary skill in the art. The multiple-disc laser can be used for ultra-short-pulse ablation to provide efficient material removal with high ablation rates. A beam of high energy, ultra-short (generally sub-picosecond) laser pulses can literally vaporize any material including steel or even diamonds. Such a pulse has an energy-per-unit-area that ionizes the atoms at a spot on a surface and the ionized atoms are repelled from the surface. A series of pulses can rapidly create a deep hole, line, trench or valley.

Some machining applications can be done with small (e.g., 10 to 20 micron diameter) spots, whereas other applications need larger (e.g., 40 to 100 micron) spots.

While solid-state laser systems can supply enough energy in a form compressible to short-enough pulses, for the larger spot sizes, the efficiency of such systems has been very low (generally less than 1%), creating major heat dissipation problems, and thus requiring very expensive systems that provide only slow machining due to low pulse repetition rates.

The present invention may use matched beam and pumping patterns within the amplifier and essentially eliminate heating due to amplified spontaneous emission. The present invention may operate at a wavelength such that the optical amplifier can be directly pumped by laser diodes emitting wavelengths of greater than about 900 nm, further increasing the efficiency. In some embodiments efficiencies of over 30% may be obtained, lowering the size and cost of the system and greatly increasing machining speed.

Some embodiments of the present invention include a multi-pass configuration which may include a disk array that offers a number of advantages in the operation of high power optical amplifiers. A three-pass unstable cavity 8 is illustrated in FIG. 1. In some embodiments the processed disks may be used in amplifiers having more than one disk and is longer with respect to height. The input beam 10 is small and passes through a hole 12 in the concave mirror 14 that is on the axial centerline of the disk array 16. In some embodiments the array 16 is a $Cr^{4+}$:YAG disc array. The beam 10 is amplified by the initial pass and is subsequently reflected and spread by a convex mirror 18 (shown not to scale, enlarged to illustrate convex surface); the mirror 18 can be about the same size as the hole 12.

The divergent beam (not shown) passes back through the disc array 16 where it is again amplified and then collimated by concave mirror 14. The collimated beam (not shown) passes a final time through the disk array 16 where it reaches the saturation fluence level of the entire array and exits the cavity as output beam 20. The output beam 20 exiting around the small convex mirror 18. Each pass through the disc array 16 amplifies the energy of the beam 10. some embodiments of the present invention use a $Cr^{4+}$:YAG and the saturation energy density per unit area of the $Cr^{4+}$:YAG is about 0.5 $J/cm^2$. Beam divergence improves gain extraction efficiency, reduces ASE noise, and permits high optical power without damage to the crystals or cavity mirrors 14 and 18.

The present invention includes a method of patterning disks for better pumping and to avoid pumping regions that are un-swept or under-swept by the beam being amplified and thus are likely to cause ASE. Thus, in some embodiments the undoped outer edges may be left for mounting. A co-dopant (e.g., emitting between the pumping wavelength and the beam wavelength) may also be used. In some embodiments, the dopant may be deposited in a patterned fashion, as described herein. Different doping pattern may be used on different disks, on opposite sides of the same disk or different regions of the same disk.

The pumping light pattern may be controlled to have the same pattern as the beam. The doping in some embodiments may have a Gaussian profile; however, any other desired profile may be used as necessary. Shaping of doping can also compensate for other system elements (e.g., lenses).

The present invention includes a method of fabricating an optically-pumped disk-array for a solid-state laser amplifier having one or more disks, wherein one or more of the one or more disks have two opposed surfaces, including the steps of patterning a photoresist mask on one or more of the two opposed surfaces of the one or more disks and processing the one or more disks through the patterned photoresist mask, whereby the temperature profile is improved radially across the disk's surface, amplified spontaneous emission are reduced, or combinations thereof.

In some embodiments, the processing varies the degree of doping of the disks and the dopant or the number of different dopants. For example, the dopant may diffuse through the mask or may be implanted through the mask. The dopant may have a Gaussian profile to match a Gaussian profile of the beam; however other profiles may be used. The patterning and depositions may be done using semiconductor fabrication techniques. The patterning may be formed by lithography using openings in the form of lines, shapes or dots; however, other shapes may also be used. The sizes of openings and the spacing of the openings may be varied to change the amount of doping that enters the disk at different locations. The remaining mask dimensions may be small compared to the light wavelength. Additionally, the sub-micron local variations have negligible effect on the diffusion or implantation.

In some embodiments, one or more channels may be etched partially through the mask The one or more channels may be used to reduce reflection at the surface and/or to cool the surface. The one or more channels may be partially filled with one or more liquids. The one or more channels may be filled by capillary action and may be use as part of a heat pipe disk cooler. The liquids may be one or more liquids and may be homogeneous or heterogeneous in composition. The liquid may evaporate from the disks and the resulting vapor is condensed remotely (e.g., in a finned condenser) and returned to the disks. Such a heat-pipe arrangement can be self-powered and thus does not decrease system efficiency.

The one or more channels may alternately be at least partially formed by laser ablation including ablation using patterned masks. Optical ablative surface cleaning may also be used to ablate any material with dry removal and thus avoid problems during surface cleaning. The surface may be pre-cleaned in the normal manner in some embodiments. Additionally, surface layers with crystal defects from sawing, chemical-mechanical polishing, and normal cleaning techniques may be removed without causing defects in the newly exposed surface. The optical beam may also cause ionization of both the surface and any particles on the surface and thus, can repel particles larger than the light wavelength.

As the top few monolayers of the surface are removed, the atoms leave at high velocity removing smaller than the wavelength of the light sub-micron particles. Preferably during cleaning, the optical ablation spot is scanned by two piezoelectrically driven mirrors or one piezoelectrically driven mirror and a motor driven stage that gives relative motion between the optical beam emitting probe and the wafer.

The disks may be in the shape of a coin and can range through the sizes of common coins, however a person of ordinary skill in the art will recognize that other shapes (squares, hexagons, etc.) and sizes may be used. Furthermore, the optically pumped optical amplifier may be a Ti:sapphire solid-state laser, but is preferably a $Cr^{4+}$:YAG laser where a disk-array solid-state laser amplifier is fabricated. The present invention may be used to pattern a photoresist mask on at least one side of at least one of the disks in the array and processing the disks through the patterned photoresist mask to improve performance of the amplifier.

In some embodiments, the ablation system is packaging using semiconductor packaging techniques. Such semiconductor-type processing as can be used on the laser amplifier support components (e.g., electronic controllers, pump diodes, interconnecting electrical and optical cables, multichip modules, etc.) and their packaging. In some embodiments the present invention may include a multi-chip module, e.g., may be within a butterfly package or the chips may be on a PC board (including a ceramic board). The interconnections may be with combination cables (e.g., fiber-optical and electrical). Other embodiments may include optical interconnects through optical fibers, rather than beamed from device to device through air, especially in the low-power portion of the system. Such packaging can allow high-power system to fit into a relatively small container, e.g., a shoebox-sized container.

Generally, the pumping power and timing between pulses may be controlled such that pumping does not saturate the disc array and thus ASE is reduced. Control information of such a system and other information on ablation systems are given in the following co-pending applications (which are also at least partially co-owned by the owners hereof).

The first four applications noted below by docket number, title and provisional number, were filed May 20, 2003 and are hereby incorporated by reference herein: Laser Machining—provisional application U.S. Provisional Patent Applications, Ser. No. 60/471,922; "Camera Containing Medical Tool" U.S. Provisional Patent Applications, Ser. No. 60/472,071; "Scanned Small Spot Ablation With A High-Rep-Rate" U.S. Provisional Patent Applications, Ser. No. 60/471,972; "Stretched Optical Pulse Amplification and Compression", U.S. Provisional Patent Applications, Ser. No. 60/471,971. These amplifiers can be controlled and/or used in systems in generally the same manner as the fiber amplifier of the eleven co-pending applications noted below by docket number, title and provisional number, were filed Aug. 11, 2003 and are hereby incorporated by reference herein: "Controlling Repetition Rate Of Fiber Amplifier" U.S. Provisional Patent Applications, Ser. No. 60/494,102; "Controlling Pulse Energy Of A Fiber Amplifier By Controlling Pump Diode Current" U.S. Provisional Patent Applications, Ser. No. 60/494,275; "Pulse Energy Adjustment For Changes In Ablation Spot Size" U.S. Provisional Patent Applications, Ser. No. 60/494,274; "Ablative Material Removal With A Preset Removal Rate or Volume or Depth" U.S. Provisional Patent Applications, Ser. No. 60/494,273; "Fiber Amplifier With A Time Between Pulses Of A Fraction Of The Storage Lifetime;" "Man-Portable Optical Ablation System" U.S. Provisional Patent Applications, Ser. No. 60/494,321; "Controlling Temperature Of A Fiber Amplifier By Controlling Pump Diode Current" U.S. Provisional Patent Applications, Ser. No. 60/494,322; "Altering The Emission Of An Ablation Beam for Safety or Control" U.S. Provisional Patent Applications, Ser. No. 60/494,267; "Enabling Or Blocking The Emission Of An Ablation Beam Based On Color Of Target Area" U.S. Provisional Patent Applications, Ser. No. 60/494, 172; "Remotely-Controlled Ablation of Surfaces" U.S. Provisional Patent Applications, Ser. No. 60/494,276 and "Ablation Of A Custom Shaped Area" U.S. Provisional Patent Applications, Ser. No. 60/494,180. These amplifiers can be controlled and/or used in systems in generally the same manner as the fiber amplifier of the two co-pending applications noted below by docket number and, title that were filed on Sep. 12, 2003: co-owned Ser. No. 60/502,879;ABI-20 "Spiral-Laser On-A-Disc;" and partially co-owned Ser. No. 60/502,886; ABI-21 "Laser Beam Propagation in Air;" Ser. No. 60/505,968; ABI-24 "High Power SuperMode Laser Amplifier" filed Sep. 25, 2003; Ser. No. 60/508,136; ABI-25 "Semiconductor Manufacturing Using Optical Ablation" filed Oct. 2, 2003; Ser. No. 60/510,855; ABI-26 "Composite Cutting With Optical Ablation Technique" filed Oct. 14, 2003; Ser. No. 60/512,807; ABI-27 "Material Composition Analysis Using Optical Ablation", filed Oct. 20, 2003; Ser. No. 60/529,425; ABI-28 "Quasi-Continuous Current in Optical Pulse Amplifier Systems. ABI-29 Ser. No. 60/529,443; "Optical Pulse Stretching and Compressing" both filed Dec. 12, 2003. See also ABI-30 Ser. No. 60/539,026; "Start-up Timing for Optical Ablation System;" Ser. No. 60/539,024; ABI-31 "High-Frequency Ring Oscillator;" and ABI-32 Ser. No. 60/539,025; "Amplifying of High Energy Laser Pulses;" filed Jan. 23, 2004.

Although the present invention and its advantages have been described above, it should be understood that various changes, substitutions and alterations can be made herein without departing from the spirit and scope of the invention as defined by the appended claims. While solid-state, generally means single crystal material, the term as used herein, may include polycrystalline or even amorphous material. Moreover, the scope of the present application is not intended to be limited to the particular embodiments of the process, machine, manufacture, composition of matter, means, methods and steps described in the specification, but only by the claims.

What is claim is:

1. A method of fabricating an optically-pumped disk-array solid-state laser amplifier having one or more disks, wherein one or more of the one or more disks have two opposed surfaces, comprising the steps of:

patterning a photoresist mask on one or more of the two opposed surfaces of the one or more disks; and processing the one or more disks through the patterned photoresist mask, whereby the temperature profile improves radially across the surface of the disk, amplified spontaneous emission is reduced or a combination thereof.

2. The method of claim 1, wherein the processing further comprises the steps of comprises adding one or more dopants to the one or more disks.

3. The method of claim 2, wherein the one or more dopants are at least partially diffuse through the photoresist mask.

4. The method of claim 2, wherein the one or more dopants are implanted through the photoresist mask.

5. The method of claim 1, further comprising the step of etching one or more channels at least partially through the photoresist mask.

6. The method of claim 5, wherein the one or more channels reduce reflection.

7. The method of claim 5, wherein the one or more channels provide for cooling.

8. The method of claim 7, wherein the one or more channels at least partially contain one or more liquids.

9. The method of claim 8, wherein the one or more channels are filled by capillary action, and used as part of a heat pipe disk cooler.

10. The method of claim 2, wherein the one or more dopants have a Gaussian profile to approximately match a Gaussian beam profile.

11. The method of claim 1, wherein the optically-pumped disk-array solid-state laser amplifier is pumped by one or more laser diodes with an emission wavelength of greater than about 900 nm.

12. The method of claim 1, wherein the optically-pumped disk-array solid-state laser amplifier comprises a $Cr^{4+}$:YAG disc array.

13. The method of claim 1, wherein the optically-pumped disk-array solid-state laser amplifier produces a beam of pulses that is amplified in at least three passes through the optically-pumped disk-array solid-state laser amplifier.

14. A method of fabricating a disk-array solid-state laser amplifier, comprising the steps of:
  patterning a mask on at least one side of at least one of the disks in the disk array; and
  processing the disks through the patterned mask to improve performance of the disk-array solid-state laser amplifier.

15. The method of claim 14, wherein the disk-array solid-state laser amplifier comprises a $Cr^{4+}$:YAG disc array.

* * * * *